United States Patent [19]
Harding

[11] 3,785,493
[45] Jan. 15, 1974

[54] AQUARIUM SIPHON
[76] Inventor: William R. Harding, 6144 E. St. Joseph St., Indianapolis, Ind. 46219
[22] Filed: June 5, 1972
[21] Appl. No.: 259,718

[52] U.S. Cl. .................................. 210/169, 119/5
[51] Int. Cl. ............................................ E04h 3/20
[58] Field of Search ......................... 119/5; 210/169

[56] References Cited
UNITED STATES PATENTS

| | | | |
|---|---|---|---|
| 3,135,238 | 6/1964 | Eyl | 119/5 |
| 3,261,471 | 7/1966 | Halpert | 210/169 |
| 2,980,256 | 4/1961 | Nash | 210/169 |
| 2,989,185 | 6/1961 | Lombardi | 210/169 |
| 3,304,912 | 2/1967 | Hackman et al. | 119/5 |

*Primary Examiner*—Charles N. Hart
*Attorney*—Harold R. Woodard

[57] ABSTRACT

An apparatus for siphoning foreign material from the top surface of the water within an aquarium tank. A liquid receptacle is suspendedly mounted externally to the aquarium tank having filtering means for cleaning the water taken from the top portion of the tank. The receptacle has an outlet connected to a pump which returns the cleaned water to the tank. The water from the top portion of the tank is siphoned into the receptacle by means of an inner tube which extends freely into a floating outer tube having a plurality of slots which extend through the surface of the water within the tank. Foreign material from the top surface of the water within the tank enters the slots and then into the inner tube and eventually into the receptacle. The outer tube includes a pair of floats for insuring that the outer tube remains in a vertical position. The bottom end of the outer tube is sealed and closed for supporting ballast. As the elevation of the top surface of the water within the aquarium tank changes, the elevation of the outer tube will also change with the inner tube remaining stationary.

9 Claims, 3 Drawing Figures

PATENTED JAN 15 1974

3,785,493

AQUARIUM SIPHON

BACKGROUND OF THE INVENTION

1. Field of the Invention

This invention is in the field of devices for cleaning a body of liquid such as found in an aquarium tank.

2. Description of the Prior Art

It is known to remove water from an aquarium, to then clear the water and then return the water to the aquarium. Some of the prior art devices for removing the water from an aquarium are disclosed in the following U. S. Pat.

No. 2,737,490 issued to Robert A. Lambertson;
No. 3,321,082 issued to Allan H. Willinger; and,
No. 3,485,373 issued to Edgar A. Powers.

Typically, the prior art devices remove the water from the bottom of the aquarium since generally the sediment settles to the bottom. Some foreign matter, however, remains on the top surface of the water within the aquarium and may form a scum. The apparatus disclosed herein is particularly useful in removing foreign material from the top surface of the water within the aquarium. Likewise, it may be used for removing foreign material from any body of liquid such as water within a swimming pool. The apparatus is provided with a floatable tube which allows the apparatus to function regardless of the change in elevation of the top surface of the liquid.

SUMMARY OF THE INVENTION

One embodiment of the present invention is an apparatus for cleaning the top surface of a body of liquid within a container comprising an outer tube in the container having a top end and a sealed bottom end, the tube having a plurality of slots extending from externally of the liquid at the top end to beneath the top surface towards the bottom end, a liquid receptacle suspendedly mounted externally to the container having filtering means mounted therein, the receptacle having an outlet tube beneath the filtering means, an inner tube extending through the top end and into the outer tube, the inner tube having an inlet end positioned below the top surface for receiving foreign matter flowing from the top surface through the slots and into the inner tube, the inner tube extending into the receptacle and having an outlet end positioned lower in elevation than the top surface and above the filtering means, and pumping means connected to the outlet tube being operable to pump liquid cleaned by the filtering means in the receptacle back into the container.

It is an object of the present invention to provide an apparatus for cleaning the top surface of a body of liquid.

It is a further object of the present invention to provide a new and improved apparatus for cleaning the water within an aquarium.

Yet another object of the present invention is to provide an apparatus for cleaning the top surface of the water within an aquarium.

Related objects and advantages of the present invention will be apparent in the following description.

DESCRIPTION OF THE PREFERRED EMBODIMENT

Figure 1:
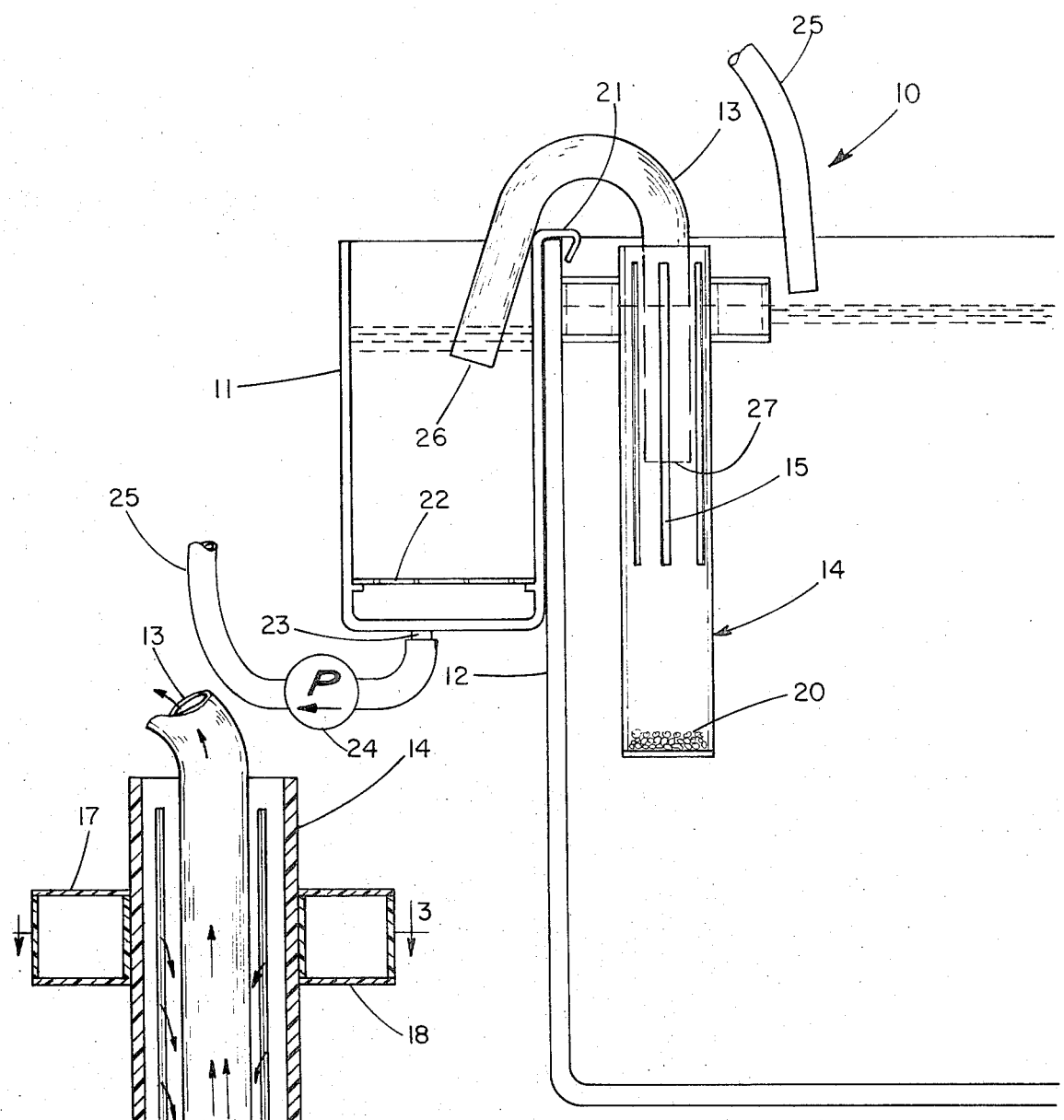
FIG. 1 is a fragmentary cross sectional view of an aquarium having the cleaning apparatus incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is illustrated an apparatus 10 for cleaning the top surface of a body of liquid within container 12. In the embodiment shown in FIG. 1, container 12 is an aquarium tank for holding water. Apparatus 10 includes a liquid receptacle 11 which is suspendedly mountable externally to container 12. Receptacle 11 is provided with a hook 21 integrally mounted thereto which extends over the side wall of container 12. The receptacle includes a filter 22 which may be produced from a material such as glass, wool, carbon, or other similar material. A pair of flanges are provided on the inner surface of the walls of receptacle 11 so as to support filter 22 and to facilitate the easy removal of the filter from the receptacle. Receptacle 11 is provided with an outlet tube 23 which is positioned beneath filter 22 and connected to pump 24 which forces the liquid from receptacle 11 via tube 25 back into container 12 after the liquid has been cleaned.

Figure 3:
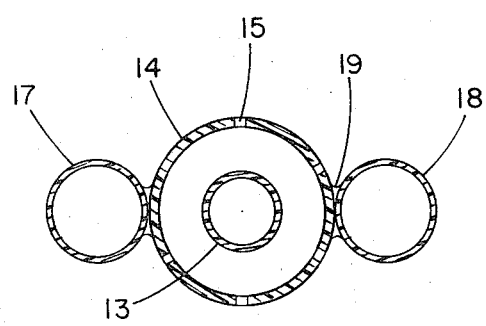
FIG. 3 is an enlarged cross sectional view taken along the line 3—3 of FIG. 2 and viewed in the direction of the arrows.

A hook shaped tube 13 having an outlet 26 and an inlet 27 extends out of the water in container 12 over the side wall of the container and into receptacle 11. The outlet end 26 of tube 13 is positioned at a higher elevation than the inlet end 27. Inner tube 13 extends freely into an outer tube 14 which has a plurality of slots 15 extending from externally of the water within container 12 at the top end of tube 14 to beneath the top surface of the water within container 12 and towards the bottom end of tube 14. As shown in FIG. 3, the inside diameter of tube 14 is larger than the outside diameter of tube 13 allowing the inner tube to remain stationary as the outer tube floats and moves vertically as the top surface of the water within container 12 moves vertically. Tube 14 includes a pair of gas sealed enclosures 17 and 18 mounted thereto which allows tube 14 to float and remain vertically erect.

Figure 2:
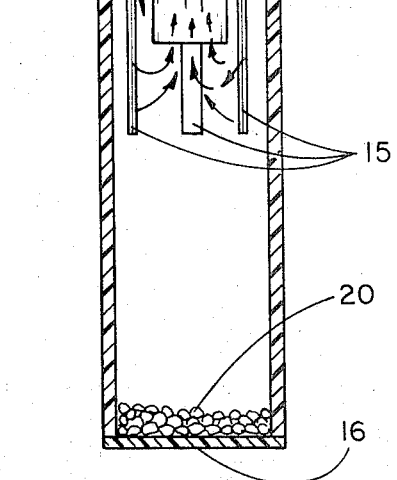
FIG. 2 is an enlarged fragmentary cross sectional view of a portion of the cleaning apparatus shown in FIG. 1.

The bottom end 16 of tube 14 is closed for holding ballast 20 within tube 14. A sufficient amount of ballast 20 may be inserted through the top end of tube 14 in order that the tube is appropriately balanced in a vertical position with the top end of tube 14 projecting externally of the water within container 12. As shown in FIG. 5, both the outer tube and inner tube are cylindrical with the outer cylindrical surface of the inner tube being spaced from the inner cylindrical surface of the outer tube 14. Thus, foreign material from the top surface of the water within container 12 may enter through slots 15 as shown by the arrows in FIG. 2 and then enter the bottom end 27 of tube 13 eventually emptying into receptacle 11. The water within receptacle 11 then passes through filter 22 with the foreign matter being cleaned from the water. The clean water exits receptacle 11 via tube 23 and is pumped back into container 12.

It will be noted that tube 13 has a bottom end 27 positioned below the top surface of the water within container 12 so as to receive the foreign matter flowing from the top surface through slots 15 and into tube 13. Many variations are contemplated and included in the invention disclosed herein. For example, in one embodiment, the tubes and receptacles were produced from a material such as plastic; however, other materials may also be utilized. Pump 24 is a conventional electrical liquid pump such as is typically found with an aquarium. As shown in FIG. 3, the pair of sealed gas enclosures 17 and 18 are mounted externally to tube 14 by means 19 such as welds or adhesives. When utilizing the subject invention for cleaning water within an aquarium, the slots 15 must not be sufficiently large so as to allow the passage of fish. On the other hand, the slots must be sufficiently large so as to provide for the velocity of water through the slots to be sufficiently great to carry the foreign matter through the slots and into the inner tube.

In an alternate embodiment, the outer tube was not provided with floatation means but instead was secured at its top and bottom ends to the inner tube by means such as O-rings. The operation of the alternate embodiment for cleaning the foreign matter from the top surface of the water within the aquarium was the same. It can be appreciated that the invention disclosed herein may be utilized for other purposes, such as, cleaning foreign matter from the top surface of a swimming pool. In order to start the cleaning process of the device disclosed herein, a sucking pressure should be applied to the outlet end of the inner tube thereby siphoning the water from the aquarium and into the receptacle. The flow of water will continue as long as the water level within the receptacle does not exceed the water level in the container. Thus, the pump must be sufficiently large so as to provide for the rapid removal of the water from the receptacle and back into the container.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. An apparatus for cleaning the top surface of a body of liquid within a container comprising:
    an outer tube in said container having a top end and a sealed bottom end, said tube having a plurality of slots extending from externally of said liquid at said top end to beneath said top surface towards said bottom end; recirculation means for returning liquid to said container; and
    an inner tube extending through said top end and into said outer tube, said inner tube having an inlet end positioned below said top surface for receiving foreign matter flowing from said top surface through said slots and into said inner tube, said inner tube having an outlet end positioned lower in elevation than said top surface and positioned to couple said liquid to said recirculation means.

2. The apparatus of claim 1 and further comprising:
    floatation means mounted on said outer tube being operable to float said outer tube in said liquid in a vertically erect position; and wherein:
    said outer tube has an inside diameter larger than the outside diameter of said inner tube allowing said inner tube to remain stationary as said outer tube floats and moves vertically as said top surface moves vertically.

3. The apparatus of claim 1 in which said recirculation means comprises:
    a receptacle positioned lower in elevation than said top surface for receiving liquid from the outlet end of said inner tube;
    filter means within said receptacle for filtering the liquid received from said inner tube; and
    pumping means coupled to said receptacle for removing the filtered liquid from said receptacle and returning said filtered liquid to said container.

4. The apparatus of claim 3 and further comprising:
    floatation means mounted on said outer tube being operable to float said outer tube in said liquid in a vertically erect position; and wherein:
    said outer tube has an inside diameter larger than the outside diameter of said inner tube allowing said inner tube to remain stationary as said outer tube floats and moves vertically as said top surface moves vertically.

5. The apparatus of claim 4 wherein:
    said bottom end of said outer tube is closed for holding ballast within said outer tube.

6. The apparatus of claim 5 wherein:
    said floatation means includes a pair of sealed enclosures mounted externally to said outer tube.

7. The apparatus of claim 6 wherein:
    said outer tube and said inner tube are both cylindrical with the outer cylindrical surface of said inner tube being spaced from the inner cylindrical surface of said outer tube.

8. The apparatus of claim 7 wherein:
    said inner tube is hook-shaped with said outlet end of said inner tube being positioned at a higher elevation than said inlet end of said inner tube.

9. The apparatus of claim 8 wherein:
    said receptacle has a hook attached thereto which extends over the side wall of said container.

* * * * *